United States Patent [19]

Caster

[11] Patent Number: 5,064,109
[45] Date of Patent: Nov. 12, 1991

[54] HAND-HELD VIDEO CAMERA SUPPORT

[76] Inventor: Paul T. Caster, 2821 E. Belleview, Milwaukee, Wis. 53211

[21] Appl. No.: 576,007

[22] Filed: Aug. 31, 1990

[51] Int. Cl.$^5$ .......................... A45F 5/00; A45F 3/14
[52] U.S. Cl. .................................. 224/267; 224/219; 224/908; 352/243; 354/82; 2/161 A
[58] Field of Search ............... 224/267, 219, 221, 249, 224/908, 222; 352/243; 354/82; 2/16, 17, 20, 159, 160, 161 R, 161 A, 162

[56] References Cited

U.S. PATENT DOCUMENTS

| | | | |
|---|---|---|---|
| 712,843 | 11/1902 | Paul | 224/267 |
| 3,060,625 | 10/1962 | Glass et al. | 224/267 |
| 3,938,166 | 2/1976 | Sloop | 354/82 |
| 3,942,194 | 3/1976 | Winter | 3/1 |
| 3,966,101 | 6/1976 | Taylor, III | 354/82 |
| 4,332,382 | 6/1982 | Smith | 2/161 A |
| 4,447,912 | 5/1984 | Morrow | 2/159 |
| 4,496,228 | 1/1985 | Schmidt | 352/243 |
| 4,504,980 | 3/1985 | Butcher | 2/160 |
| 4,561,122 | 12/1985 | Stanley et al. | 2/161 A |
| 4,692,807 | 9/1987 | Kee | 354/82 |

Primary Examiner—Ernest G. Cusick
Assistant Examiner—Keith Kupferschmid
Attorney, Agent, or Firm—Andrus, Sceales, Starke & Sawall

[57] ABSTRACT

A support for a portable lightweight hand-held video camera includes an arm/wrist band which carries a support brace for the camera, the arm/wrist band substantially immobilizing relative movement between the user's arm and wrist to minimize jitters normally associated with recordings made by hand-held video cameras.

9 Claims, 1 Drawing Sheet

U.S. Patent    Nov. 12, 1991    5,064,109
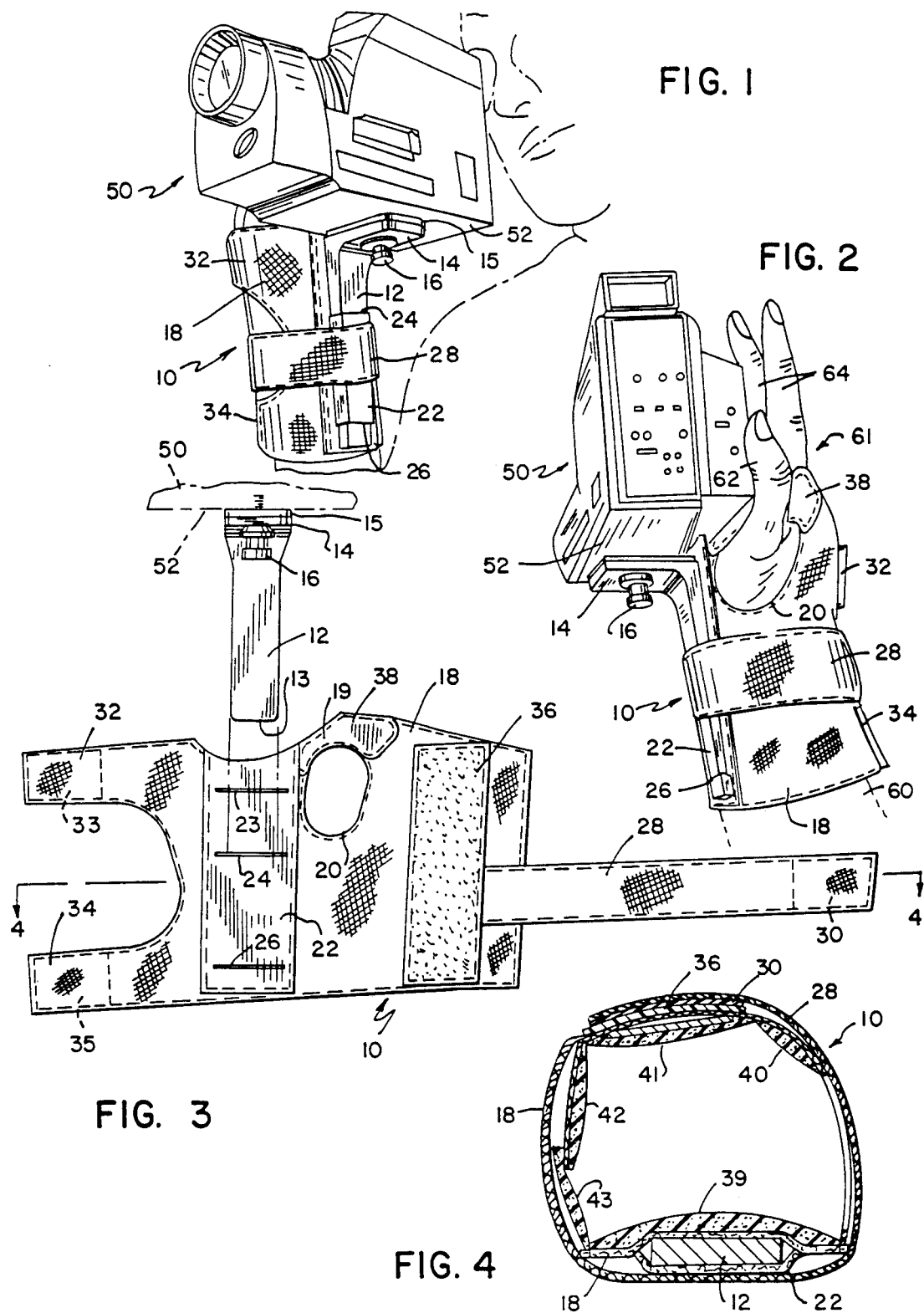

HAND-HELD VIDEO CAMERA SUPPORT

BACKGROUND OF THE INVENTION

1. Field of the Invention

This invention relates generally to devices for supporting video cameras and is specifically directed to a support for a lightweight portable hand-held video camera.

2. Description of the Prior Art

The development of lightweight, portable video cameras, such as camcorders and the like, has created a need for a device which will minimize the unsteadiness of the user to eliminate the jittery or shakey quality of the recordings often resulting from the use of such cameras. It is virtually impossible for even the most skilled user to take quality shots of moving objects with a hand-held camera. The tendency to move the wrist, hand and arm when manipulating the controls and focusing the camera almost always results in a jittery or shakey recording. While tripods eliminate this problem, they defeat the primary purpose of the portable hand-held video camera by interfering with its portability.

Over the years, there have been a number of supports developed for assisting, holding and steadying hand-held devices. General examples of such supports are shown in the Paul U.S. Pat. No. 712,843; the Winter U.S. Pat. No. 3,942,914 and the Butcher U.S. Pat. No. 4,504,980.

Still camera supports are disclosed and described in the Sloop U.S. Pat. No. 3,938,166 and the Taylor U.S. Pat. No. 3,966,101. Taylor, in particular, shows a device for mounting a 35 mm camera on a support bracket by utilizing the standard tripod mounting hole provided in the base of the camera. The bracket is strapped to the forearm of the user to hold the camera in place without the use of hands. The Taylor device is specifically designed to permit use of a 35 mm camera by an amputee or other physically handicapped operator. The Taylor device would not be readily adaptable for use with camcorders because it does not minimize movement between the wrist and the arm, which is the primary cause of the shakey, jittery, poor quality recordings made by hand-held camcorders. Taylor is primarily designed for holding a 35 mm camera which extends generally in a plane parallel to the user's face, whereas a typical camcorder extends generally in a plane perpendicular to the user's face. Taylor would not provide for proper balancing of the camcorder to reduce fatigue. Further, it does not immobilize the wrist action which is the greatest cause of the shakey, jittery images when using hand-held video cameras.

SUMMARY OF THE INVENTION

The camcorder support of the present invention overcomes the shortcomings and disadvantages of the prior art devices by providing a balanced support brace for the camcorder while immobilizing the wrist to eliminate jitters. The user's hand is free to operate the controls of the camcorder without causing movement of the camcorder to disturb the quality of the recorded image.

The camcorder support includes an arm/wrist band which completely envelopes the arm and wrist to minimize relative movement therebetween. A thumb hole is provided, permitting the arm/wrist band to cover a good portion of the hand while providing free finger and thumb movement for operating the controls of the camera. A support brace is secured in the arm/wrist band and includes a mounting bracket for mounting the camcorder to the support brace in the tripod mounting hole typically provided in the base of the camcorder.

The arm/wrist band and support bracket are strapped to the arm and wrist of the user using straps and fasteners to hold the arm, wrist, support and camcorder in a fixed relationship so that the camcorder movement is basically limited to movement of the user's elbow.

Use of the camcorder support of the subject invention has resulted in tripod quality recordings, particularly when the user can support his elbow on a stationary support surface. This greatly enhances the use of portable, lightweight, hand-held camcorders without minimizing their portability.

It is, therefore, an object of the subject invention to provide a camcorder support which minimizes the shakey, jittery images generally resulting from the use of hand-held video cameras.

It is a further object of the invention to provide a hand-held video camera support which permits free use of the fingers and thumb to control the camera while supporting the camera in a secure, jitter-free manner.

It is a further object of the invention to provide a comfortable, snug arm/wrist band for supporting a hand-held video camera in a well-balanced, non-fatiguing manner.

Other objects and features of the invention will be readily apparent from the drawing and detailed description which follows.

BRIEF DESCRIPTION OF THE DRAWINGS

FIG. 1 is a frontal perspective view of a camcorder and the camcorder support of the present invention.

FIG. 2 is a rear perspective view of the camcorder and the camcorder support of FIG. 1.

FIG. 3 is an illustration of the camcorder support in its disassembled form.

FIG. 4 is a sectional view looking in the general direction of arros 4—4 in FIG. 3, and illustrates the camcorder support in its assembled form.

DETAILED DESCRIPTION OF THE PREFERRED EMBODIMENT

The camcorder support 10 of the present invention is designed to support a camcorder, videocam or other small, lightweight video camera 50 on a support brace 12 which may be strapped to the arm/wrist 60 of a user without impairing freedom of movement of the user's thumb 62 and fingers 64. An important advantage of the support 10 is that it maintains a rigid relationship between the wrist, arm and hand of the user, keeping the camcorder still when the thumb and fingers are used to control the camcorder operation.

In the preferred embodiment, the support 10 includes an arm/wrist band 18 made of leather or other suitable flexible, non-stretchable material. The vertical support brace 12 is carried in the support holder 22 sewn or otherwise suitably mounted on the band 18.

The vertical support brace 12 includes a horizontal mounting bracket 14 and a spacer 15. Typically, the vertical support brace 12 and the bracket 14 are of a rigid, unitary construction such as steel or hard plastic or the like. The spacer 15 is constructed of a resilient material to protect the undersurface of the camcorder 50. The turn screw 16 is carried in the bracket 14 and permits mounting of the camcorder 50 onto the support bracket 15 by using the standard tripod mounting hole (not shown) typically provided in the base 52 of the camcorder.

The support holder 22 includes a plurality of slots 23, 24, 26 adapted for receiving the support brace 12. Depending on the final height desired, the end 13 of the support brace 12 is inserted in either slot 23 or slot 24 and out through slot 26. The support holder is typically made of a flexible, non-stretchable material such as leather or the like and is dimensioned to provide a snug fit between the holder 22 and the support brace 12 when the support brace is inserted in the slots.

The arm/wrist band 18 includes a thumb hole 20 which assists in positioning the camcorder support on the hand of the user, as shown in FIGS. 1 and 2. Once the thumb of the user is inserted in the thumb hole 20 (FIG. 2), the arm/wrist band is wrapped around the arm of the user. A pair of extended tabs 32, 34 (FIG. 3) are provided to overlap the arm/wrist band 18 when it is wrapped around the arm and wrist of the user. Each tab 32, 34 is provided with a Velcro patch 33, 35, respectively. The arm/wrist band 18 is provided with a hook and loop type fastener such as the Velcro brand hook pad 36 for receiving and securing the mated Velcro brand loop patches 33, 35 to secure the arm/wrist band about the arm and wrist of the user, as shown in FIG. 2.

An elongated strap 28 is also provided with one end suitably secured to the arm/wrist band 18, as shown in FIG. 3. The opposite end of the strap 28 includes a Velcro patch 30 which is received and secured by the Velcro pad 36 when the strap 28 is wrapped around the arm and wrist of the user, as shown in FIGS. 1 and 2. While the tabs 32, 34 are sufficient to hold the arm/wrist band 18 on the user, the strap 28 provides additional support, helping to immobilize the user's wrist. In addition, the strap 28 increases the holding force against the support brace 12 to minimize the likelihood of vertical slippage of the brace during use. In the preferred embodiment, the strap is made of a flexible, non-stretchable material such as leather, nylon or the like. While Velcro brand fasteners are shown in the preferred embodiment because of their convenience and inherent adjustability, it would be readily understood by those skilled in the art that other fastener means could be utilized for securing the tabs 32, 34 and the strap 28 to the arm/wrist band 18.

In its preferred form, a reinforcing pad 38 is provided at the top of the thumb hole 20. The pad 38 strengthens the narrowest portion 19 of the arm/wrist band 18. Preferably, the pad 38 is made of a soft, absorbent material such as cotton to provide a comfortable engagement surface for the area between the thumb and forefinger of the user (see FIG. 2), thus minimizing irritation which may be caused by rubbing action during use.

It is also desirable to provide resilient cushion pads 39, 40, 41, 42, and 43 on the inside surface of the arm/wrist band 18 (as shown in FIG. 4) to further increase the comfort of the user. The cushioned pads are typically made of a resilient, absorbent material such as padded cotton or the like.

In use, the camcorder 50 is mounted on the mounting bracket 14 by inserting and tightening the turn screw 16 into the tripod mounting hole (not shown) provided in the base 52 of the camcorder. The support brace 12 is then inserted in the selected slots 23 and 26 or 24 and 26 of the support holder 22, as indicated in FIG. 3. The user then inserts his thumb into the thumb hole 20 and holds the camcorder 50 in the palm of his hand. The tabs 32, 34 are wrapped around the user's arm and wrist and when snug are secured to the Velcro tab 36. The camcorder 50 may now be adjusted for vertical height to provide a comfortable working relationship between the user's thumb and fingers and the camcorder controls. The strap 28 is then wrapped around the wrist of the user and over the support brace 12 and the support holder 22. When snug, the strap is secured to the Velcro pad 36 as shown in FIGS. 1 and 2.

When using the camcorder support 10 as described herein, the movement of the camcorder is limited to the movement of the elbow of the user, greatly minimizing the undesirable, unintentional movement typically experienced with hand-held camcorders, while at the same time enhancing the freedom of movement to the fingers and thumb of the user to facilitate access to the camcorder controls. In addition, by immobilizing the wrist and supporting it with the arm/wrist band, the most fatiguing aspect of holding the camcorder is virtually eliminated.

While specific embodiments and features of the invention have been described in detail herein, it will be readily understood that the video camera support of the present invention encompasses all of the enhancements and modifications within the scope and spirit of the following claims.

What is claimed is:

1. A support for a lightweight, portable hand-held video camera of the type having a tripod mount in its base, the support comprising:
   a. a band for encircling the arm and wrist of the user, the band including a pair of elongate tabs secured to and extending outwardly from a first side edge of the band, an elongate strap secured to and extending outwardly from a second side edge of the band opposite the first side edge, and securing means mounted on the band for receiving and securing the tabs and the strap when said tabs and strap are wrapped about the arm and wrist of the user;
   b. means disposed between the band and the arm and wrist of the user for providing a snug tight fit between the band and the arm and wrist of the user to minimize relative movement therebetween; and
   c. a support brace secured to the band and adapted to be connected to the camera for supporting the camera.

2. The support of claim 1, wherein the support brace further includes:
   a. a substantially vertical, rigid portion adapted to be releasably secured to and carried by the band;
   b. a substantially horizontal portion extending outwardly from the vertical portion; and
   c. means carried on said horizontal member for securing the support bracket to the tripod mount in the base of the camera.

3. The support of claim 1, wherein the band further includes a holder for receiving and releasably securing the support brace, whereby the support brace is secured in place in the holder by the strap when the strap is wrapped around the arm and wrist of the user and secured by the securing means.

4. The support of claim 1, further including velcro patches on each of said tabs and said strap, and wherein said securing means comprises a velcro pad on said band.

5. The support of claim 1, wherein the band further includes a thumb hole for receiving the thumb of the user when the band is placed on and encircles the arm and wrist of the user.

6. The support of claim 5, further including a resilient reinforcing member secured to said band adjacent the thumb hole for providing a cushioned surface between the thumb and the forefinger of the user.

7. The support of claim 1, wherein said means for providing a snug fit includes a resilient, absorbent liner to provide a cushioned surface between the band and the arm and wrist of the user when the band is placed on and encircles the same.

8. A support for a lightweight, portable, hand-held video camera of the type having a tripod mounting in its base, the support comprising:
 a. a band for encircling the arm and wrist of the user;
 b. a pair of elongate tabs secured to and extending outwardly from a first side edge of the band;
 c. an elongate strap secured to and extending outwardly from a second side edge of the band opposite the first side edge;
 d. a substantially vertical, rigid support brace secured to and carried by the band, said support brace including a substantially horizontal, bracket integral with to and extending outwardly from the vertical brace; and
 e. securing means mounted on the band for receiving and securing the tabs and the strap when wrapped about the arm and wrist of the user.

9. The support of claim 8, wherein the band further includes a thumb hole for receiving the thumb of the user when the band is placed on and encircles the arm and wrist of the user.

* * * * *